(12) United States Patent
Patel et al.

(10) Patent No.: US 8,921,748 B2
(45) Date of Patent: Dec. 30, 2014

(54) OPTICAL WINDOW AND DETECTION SYSTEM EMPLOYING THE SAME

(75) Inventors: Umang R. Patel, Mansfield, TX (US); Kurt Schuder, Dallas, TX (US)

(73) Assignee: Lockheed Martin Corporation, Bethesda, MD (US)

(*) Notice: Subject to any disclaimer, the term of this patent is extended or adjusted under 35 U.S.C. 154(b) by 286 days.

(21) Appl. No.: 13/475,562

(22) Filed: May 18, 2012

(65) Prior Publication Data

US 2012/0292431 A1 Nov. 22, 2012

Related U.S. Application Data

(60) Provisional application No. 61/488,144, filed on May 19, 2011.

(51) Int. Cl.

| | | |
|---|---|---|
| *F41G 7/20* | (2006.01) | |
| *F41G 7/26* | (2006.01) | |
| *F42B 15/01* | (2006.01) | |
| *G01S 3/781* | (2006.01) | |
| *G01S 3/783* | (2006.01) | |
| *F41G 7/00* | (2006.01) | |
| *G02B 27/00* | (2006.01) | |

(52) U.S. Cl.
CPC .............. *F42B 15/01* (2013.01); *G01S 3/781* (2013.01); *G01S 3/783* (2013.01)
USPC ......... 244/3.16; 244/3.1; 244/3.11; 244/3.13; 244/3.15; 244/3.21; 244/3.24

(58) Field of Classification Search
CPC ........... F41G 7/20; F41G 7/22; F41G 7/2273; F41G 7/2293; F42B 10/60; F42B 10/62; F42B 10/64; F42B 15/01; G03B 19/02; G03B 19/18; H04N 5/222; H04N 5/225; H04N 5/2251; G01S 3/78; G01S 3/781; G01S 3/782; G01S 3/784
USPC ............... 244/3.1–3.3; 348/162–168, 207.99, 348/222.1, 223.1–225.1; 250/330–334, 250/336.1, 338.1, 351; 382/100, 103, 154; 396/89, 106–110
See application file for complete search history.

(56) References Cited

U.S. PATENT DOCUMENTS

| | | | | |
|---|---|---|---|---|
| 3,435,137 | A * | 3/1969 | Altshuler et al. | 250/333 |
| 3,841,585 | A * | 10/1974 | Evers-Euterneck | 244/3.15 |
| 3,993,907 | A * | 11/1976 | Veron | 250/333 |
| 4,093,154 | A * | 6/1978 | McLean | 244/3.16 |
| 4,168,813 | A * | 9/1979 | Pinson et al. | 244/3.16 |
| 4,917,330 | A * | 4/1990 | Dulat et al. | 244/3.16 |
| 5,999,122 | A * | 12/1999 | Shoucri et al. | 250/332 |
| 6,091,905 | A * | 7/2000 | Yahav et al. | 396/106 |
| 6,160,910 | A * | 12/2000 | Freifeld | 382/154 |
| 6,411,331 | B1 * | 6/2002 | Sansom-Wai et al. | 348/223.1 |
| 6,707,044 | B2 * | 3/2004 | Lannestedt et al. | 250/351 |

* cited by examiner

*Primary Examiner* — Bernarr Gregory
(74) *Attorney, Agent, or Firm* — Terry M. Sanks, Esq.; Beusse Wolter Sanks & Marie, P.A.

(57) ABSTRACT

An optical window for a detection system and method of employing the same. In one embodiment, the detection system includes an optical window configured to internally channel external incident radiation to an exit surface for emission. The detection system also includes a detector oriented to receive emitted radiation from the exit surface.

20 Claims, 7 Drawing Sheets

OPTICAL WINDOW AND DETECTION SYSTEM EMPLOYING THE SAME

This application claims the benefit of U.S. Provisional Application No. 61/488,144 entitled "Compact Receipt Optic Window," filed May 19, 2011, which application is incorporated herein by reference.

TECHNICAL FIELD

The present invention is directed to opto-electronics and, more particularly, to an optical window for a detection system and method of employing the same.

BACKGROUND

Advances in technology have led to improvements in the precision of guided munitions. As guidance systems have become more sophisticated, however, the need for even greater precision and performance is apparent. As military targets are frequently found in civilian surroundings, high performance guided munitions are necessary to destroy the targets while minimizing collateral damage. A typical approach to increase the precision of guided munitions is the application of a laser designator to illuminate the desired target. The laser signal in the form of light or electromagnetic radiation (also referred to as "radiation") reflected from the target propagates to a detector (or sensor) of the guided munition. The guidance system including a detection system (e.g., a quadrant detection system) within the radome of the guided munition guides the munition to augment the reflected laser signal received from the illuminated target.

While such laser guided munitions have been in operation for quite some time, the radome/detector design may limit the velocity of the guided munitions. In particular, many of the radome/detector designs include a hemispherical radome. The velocity of a guided munition having a hemispherical radome may be limited due to the radome's aerodynamic drag. In an effort to reduce this aerodynamic drag, the use of more aerodynamic conformal (such as conical-shaped) radomes has been attempted. This change in the radome shape, however, has created problems for the detection system used to guide the guided munition. For example, such aerodynamic radomes typically suffer from limited field of view and poor detection of small and/or distant targets. Some designs include windows or waveguides that conform to the outer surface of the munition or radome. Some of the designs, however, suffer from the same problems as the conical-shaped radomes.

In addition to the aerodynamic drag and the limited field of view regarding the radome designs, the detection systems often employ a substantial portion of the fore end (or nose) of the guided munitions. This is exacerbated by a reduction in size of the guided munitions. As a result, the warhead and other sections of the guidance system (apart from the detection system) are typically limited to a space outside of the fore end of the guided munitions.

What is needed in the art, therefore, is an optical window for a detection system employable in a guided munition or other application that overcomes the deficiencies in the prior art.

SUMMARY OF THE INVENTION

Technical advantages are generally achieved, by advantageous embodiments of the present invention, including an optical window for a detection system and method of employing the same. In one embodiment, the detection system includes an optical window configured to internally channel external incident radiation to an exit surface for emission. The detection system also includes a detector oriented to receive emitted radiation from the exit surface.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different figures generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION OF ILLUSTRATIVE EMBODIMENTS

Illustrative embodiments of the invention are described below. In the interest of clarity, not all features of an actual implementation are described in this specification. It will, of course, be appreciated that in the development of any such actual embodiment, numerous implementation-specific decisions are made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention represents a compact receive optical window that is particularly useful in guidance systems for vehicles, such as, for example, guided munitions (e.g., missiles) and the like. The optical window is configured to generally conform aerodynamically to a nose cone of such a vehicle. The optical window further exhibits a high aperture, consumes reduced space in the vehicle, and is configured to concentrate a photonic signal onto a detector (or sensor). The optical window may be configured as a wedge having a forward (or fore) portion transitioning to an aft portion, such that the aft portion is thicker than the forward portion. The window achieves substantially total internal reflection within a range of, without limitation, about zero degrees to about eight degrees boresight elevation and within a range of, without limitation, about zero degrees to about eight degrees boresight azimuth. Substantial total internal reflection is achieved such that $\Theta critical = \arcsin(N2/N1)$, which in one embodiment is about 43 degrees.

In one aspect, a compact receiving optical window includes a first surface configured to receive radiation into the compact receiving optical window and configured to reflect at least a portion of the radiation received into the compact receiving optical window, the first surface extending from a fore end to an aft end. The compact receiving optical window further includes a second surface configured to reflect at least a portion of the radiation received into the compact receiving optical window, the second surface extending from the fore end to the aft end, such that a distance between the first surface and the second surface is greater at the aft end than a distance between the first surface and the second surface at the fore end. The compact receiving optical window further includes an exit surface configured to allow at least a portion of the radiation (e.g., emitted radiation) received into the compact receiving optical window to exit the compact receiving optical window. In one embodiment, an angle defined by the first surface and the second surface is about 42 degrees. In one embodiment, the compact receiving optical window is configured to achieve substantially total internal reflection within a range of, without limitation, about zero degrees to about eight degrees boresight elevation and within a range of, without limitation, about zero degrees to about eight degrees boresight azimuth. In one embodiment, a detector (or sensor) is disposed proximate the exit surface.

Figure 1:
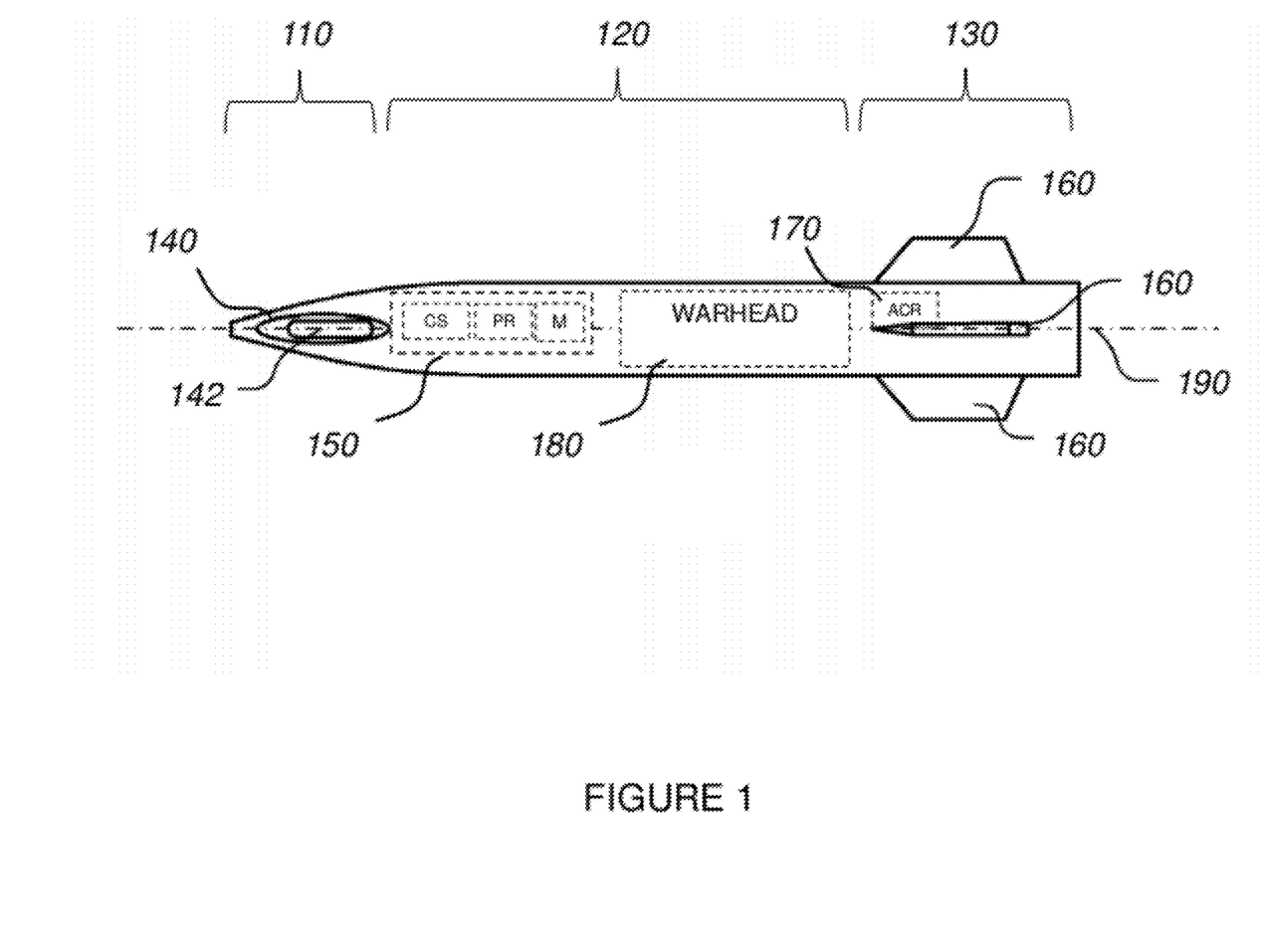
FIG. 1 illustrates a top view of an embodiment of a guided munition.

Referring initially to FIG. 1, illustrated is a top view of an embodiment of a guided munition. The guided munition includes a fore end (or nose) 110, middle section 120 and an aft end 130. As illustrated, the fore end (or nose) 110 is generally conical in shape and is often referred to as or includes a radome of the guided munition. The guided munition includes a guidance section having a detection system 140, control system 150 and control surfaces 160 coupled to an actuator (one of which is illustrated and designated 170). While portions of the guidance section are located in the different sections (e.g., the control system 150 is located in a portion of the fore end 110 and middle section 120) of the guided munition, it should be understood that the guidance section may be distributed in other section(s) thereof. Additionally, the detection system 140, control system 150, control surfaces 160 and/or actuator 170 are in electrical and/or mechanical communication with one another. The guided munition also includes a warhead 180 located in the middle section 120 thereof. Of course, the warhead 180 including, for instance, explosives may be included within other sections of the guided munition. A boresight axis of the guided munition is designated 190. It should be noted that the systems, subsystems and modules herein are not drawn to scale.

One approach to guide the guided munition is the application of a laser designator to illuminate a desired target. The laser signal in the form of light or electromagnetic radiation (again, "radiation") reflected from the target propagates through an optical window 142 of the guided munition. The optical window 142 of the detection system (e.g., a seeker such as a quadrant detection system) 140 within the fore end (or nose) 110 channels emitted radiation to a detector (not shown), which converts the emitted radiation to a detection signal (e.g., an optical signal to an electrical signal) for a conditioning subsystem (designated "CS") of the control system 150. The conditioning subsystem CS includes electronics (e.g., analog to digital converter) to digitize or otherwise format the detection signal for use by a processor (designated "PR") of the control system 150. The processor PR thereafter generates a control signal to control the control surfaces 160 via the actuator 170 to guide the guided munition to the target. The processor PR generates the control signal as a function of the detection signal (or detection signal(s)) and other parameters resident in memory (designated "M") of the control system 150 or transmitted to the guided munition from other sources. While the illustrated guided munition demonstrates a single channel guidance section, multiple channels including multiple optical windows 142 with corresponding detectors may be employed to advantage (see below).

The processor PR of the control system 150 may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples. The memory M of the control system 150 may be one or more memories and of any type suitable to the local application environment, and may be implemented using any suitable volatile or nonvolatile data storage technology such as a semiconductor-based memory device, a magnetic memory device, an optical memory device, fixed memory and removable memory. Also, programs stored in the memoryMmay include program instructions or computer program code that, when executed by an associated processor PR, enable the control system 150 to perform tasks as described herein. Of course, the memory M may form a data buffer for signals transmitted to and from the control system 150. Exemplary embodiments of the system, subsystems, and modules as described herein may be implemented by hardware (e.g., embodied in one or more chips including an integrated circuit such as an application specific integrated circuit), as software or firmware for execution by the processor PR, or combinations thereof, for the guided munition or other application.

Program or code segments making up the various embodiments may be stored in a computer readable medium or transmitted by a data signal embodied in a carrier wave, or a signal modulated by a carrier, over a transmission medium. For instance, a computer program product including a program code stored in a computer readable medium (e.g., a non-transitory computer readable medium) may form various embodiments. The "computer readable medium" may include any medium that can store or transfer information. Examples of the computer readable medium include an electronic circuit, a semiconductor memory device, a read only memory ("ROM"), a flash memory, an erasable ROM ("EROM"), a floppy diskette, a compact disk ("CD")-ROM, an optical disk, a hard disk, a fiber optic medium, a radio frequency ("RF") link, and the like. The data signal may include any signal including a signal that can propagate over a transmission medium such as electronic communication network communication channels, optical fibers, air, electromagnetic links, RF links, and the like. The code segments may be downloaded via computer networks such as secure computer networks, and the like.

Figures 2, 3:
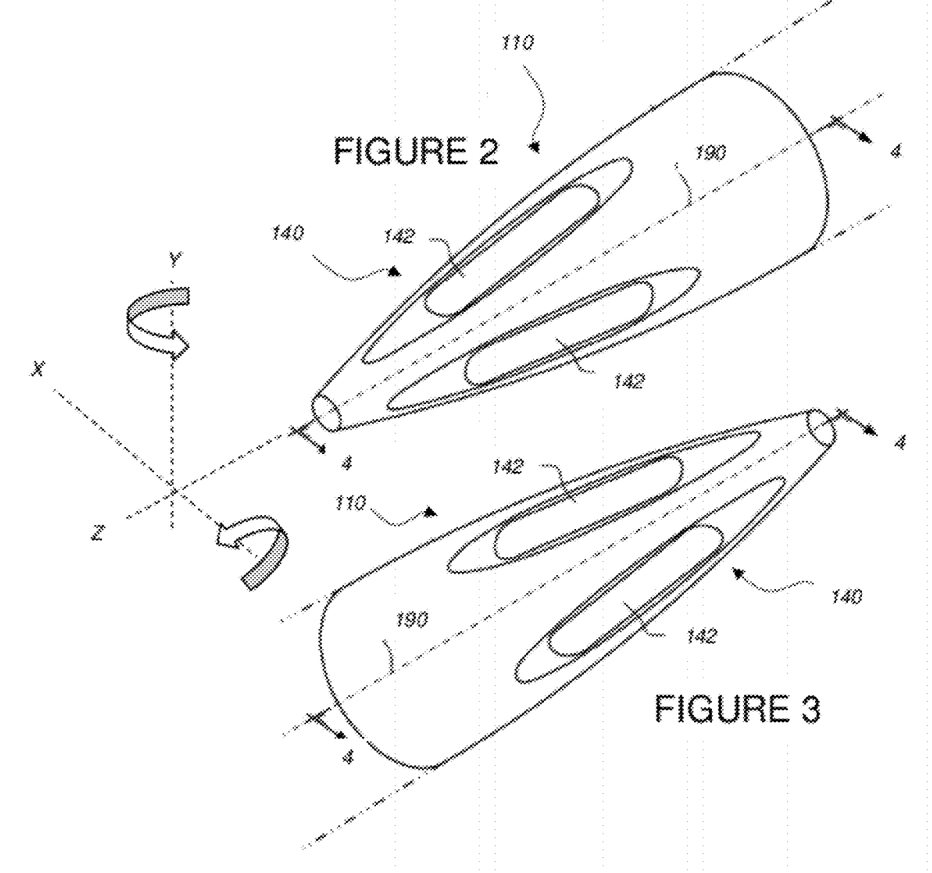
FIGS. 2 and 3 illustrate top and bottom perspective views of an embodiment of a fore end of the guided munition of FIG. 1.

Turning now to FIGS. 2 and 3, illustrated are top and bottom perspective views of an embodiment of a fore end (or nose) 110 of the guided munition of FIG. 1. The detection system (generally designated 140) embodied as a quadrant detection system with a plurality of optical windows (three of which are shown and designated 142) is arranged in a regular distributed axial rotational pattern about the boresight axis 190. A detection system 140 embodied in a seeker generally employs three or more channels (e.g., three or more optical windows and corresponding detectors). The optical windows 142 are exposed through a body of the fore end 110 to receive external incident radiation thereon. The optical window(s) 142 achieves substantially total internal reflection within a range of, without limitation, about zero degrees to about eight degrees boresight elevation and within a range of, without limitation, about zero degrees to about eight degrees boresight azimuth. As illustrated in FIG. 2, the boresight elevation rotation is about the X-axis and the boresight azimuth rotation is about the Y-axis.

With continuing reference to FIG. 1, if the detection signal (e.g., an amplitude thereof) from each detector (see below) corresponding to each optical window 142 is substantially equal, the external incident radiation is propagating substantially along the boresight axis 190. In such a situation, the guided munition is traveling along a path toward the source of the radiation. If, however, the amplitudes of the detection signals from each detector corresponding to each optical window 142 are unequal, the control system 150 calculates a desired trajectory for the guided munition directed toward the source of the radiation based at least upon the amplitudes of the detection signals. As mentioned above, the control system 150 accomplishes the change in trajectory by controlling one or more of the control surfaces 160 of the guided munition.

Figure 4:
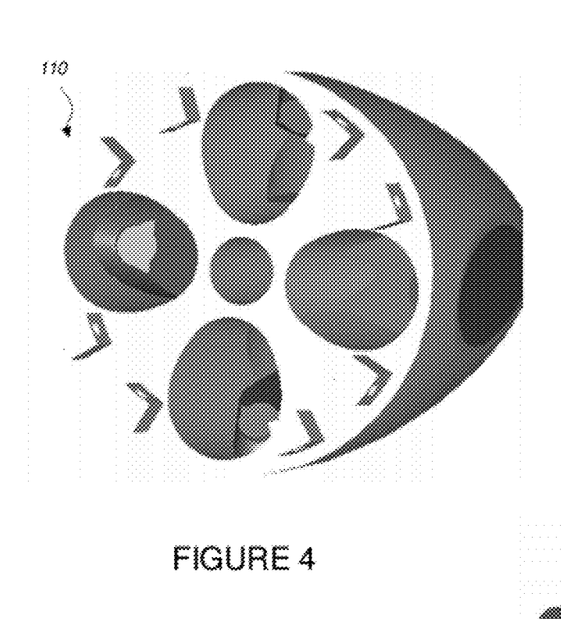
FIG. 4 illustrates a rear perspective view of an embodiment of a fore end of the guided munition of FIG. 1.
Figure 5:
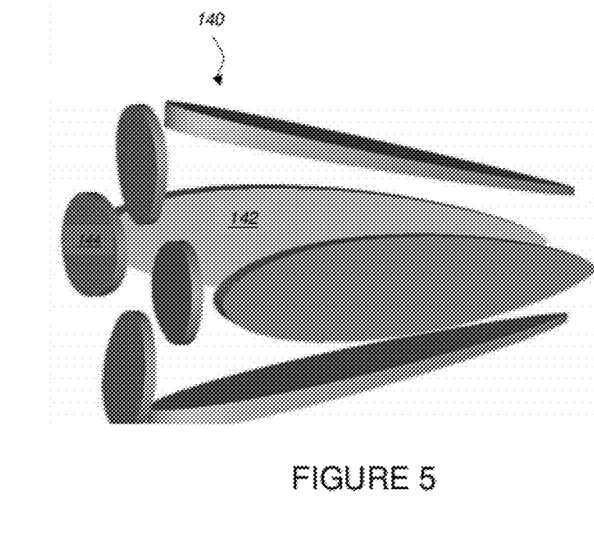
FIG. 5 illustrates a conceptual view of an embodiment of a detection system.

Turning now to FIG. 4, illustrated is a rear perspective view of an embodiment of a fore end (or nose) 110 of the guided munition of FIG. 1. The guided munition employs a detection system (e.g., a quadrant detection system including four channels and generally designated 140) including a plurality of optical windows (one of which is designated 142) and corresponding detectors (one of which is designated 144) as illustrated in the conceptual FIG. 5. The optical windows 142 and corresponding detectors 144 are arranged in a regular distributed axial rotational pattern about a boresight axis (not shown) of the guided munition.

Figure 6:
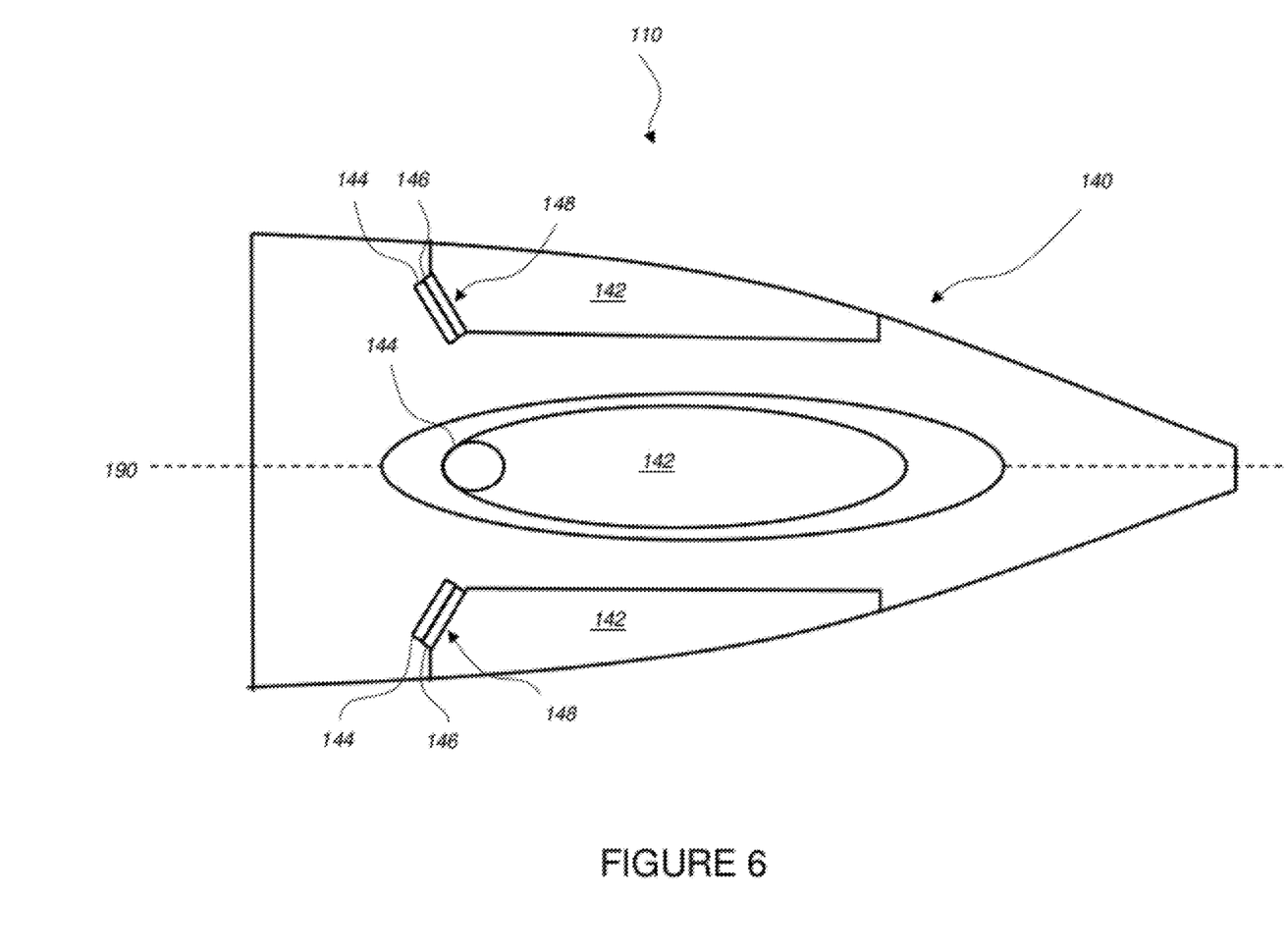
FIG. 6 illustrates a cross-sectional view of an embodiment of a fore end of the guided munition taken along line 4-4 of FIGS. 2 and 3.

Turning now to FIG. 6, illustrated is a cross-sectional view of an embodiment of a fore end (or nose) 110 of the guided munition taken along line 4-4 of FIGS. 2 and 3. The detection system (generally designated 140) is a quadrant detection system with a plurality of optical windows (three which are shown and designated 142) arranged in a regular distributed axial rotational pattern about the boresight axis 190. The optical windows 142 are exposed through a body of the fore end 110 to receive external incident radiation thereon. The detection system 140 also includes a plurality of detectors (three of which are shown and designated 144) and a corresponding plurality of optical filters (two of which are shown and designated 146). The optical filters 146 are located between an exit surface (ones of which are designated 148) of the corresponding optical windows 142 and the corresponding of detectors 144. The exit surfaces 148 may be created from a cut in a surface of the corresponding optical windows 142.

Figure 7:
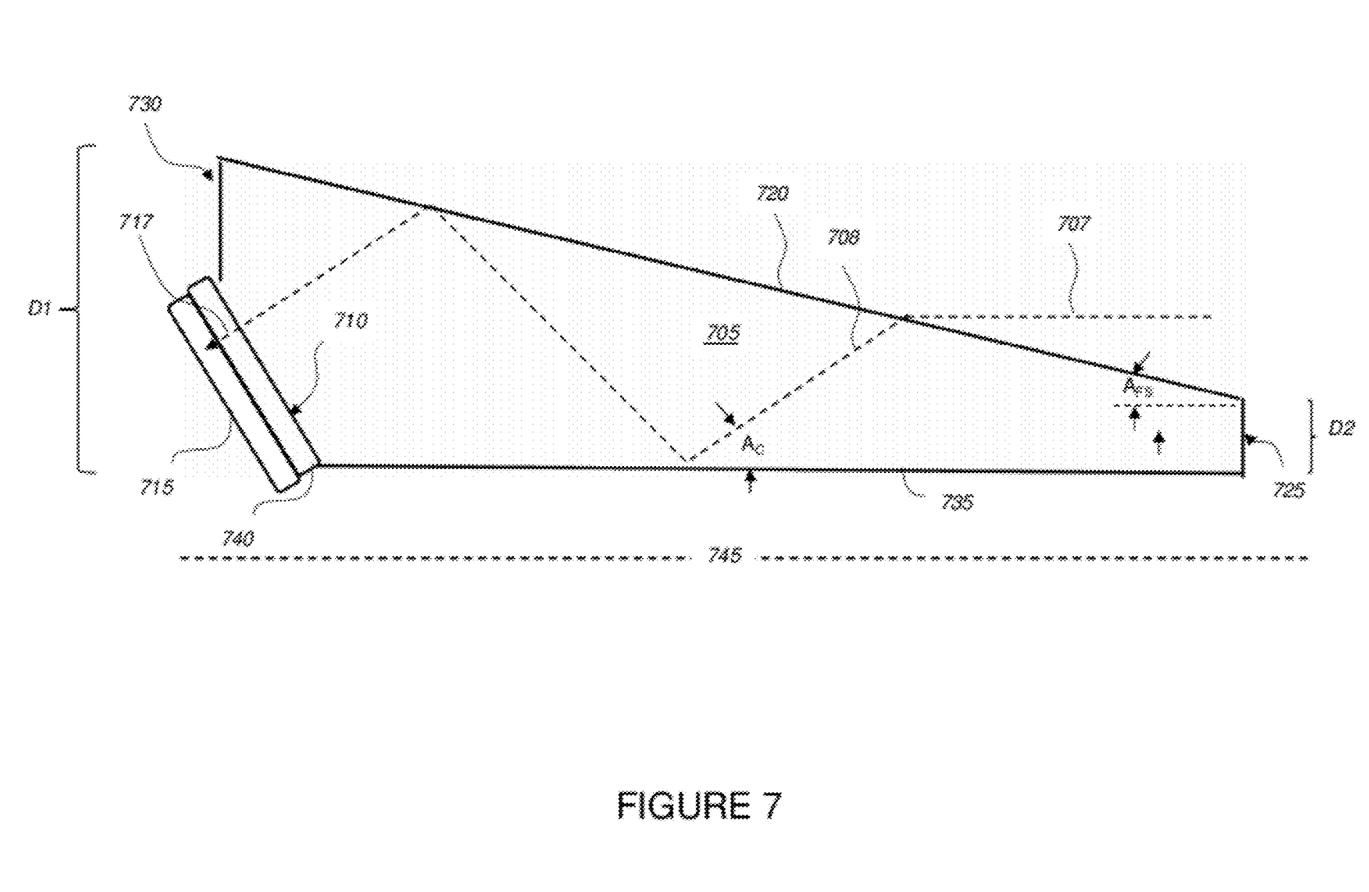
FIGS. 7 to 9 illustrate views of embodiments of a detection system, or portions thereof.

Turning now to FIG. 7, illustrated is a side view of an embodiment of a detection system including a single channel. The detection system includes an optical window 705 (e.g., fused silica) configured to internally channel external incident radiation (a single ray designated 707 traversing, for instance, the air) to an exit surface 710 for emission. For the purposes of this discussion, it is assumed that the external incident radiation 707 (or at least a portion thereof) passes through a first surface 720 of the optical window 705. The detection system also includes a detector 715 oriented to receive emitted radiation (generally designated 717) from the exit surface 710. The optical window 705 includes the first surface 720 extending from a fore end 725 to an aft end 730 of the optical window 705 and configured to receive the external incident radiation 707 thereon. The optical window 705 also includes a second surface 735 extending from the fore end 725 to the aft end 730 of the optical window 705 and including the exit surface 710. The first surface 720 and the second surface 735 are oriented to internally reflect a majority portion of the external incident radiation 707 to channel the emitted radiation 717 through the exit surface 710.

As an example, an angle $A_{FS}$ defined by the first surface 720 and the second surface 735 of the optical window 705 is about 42 degrees. Substantial total internal reflection is achieved such that the critical angle $\Theta critical = \arcsin(N2/N1)$. The critical angle is the angle of incidence above which total internal reflection occurs. As an example, assume that internal radiation 708 (representing the external incident radiation 705 that passes through the first surface 720) within the optical window 705 of fused silica has an index of refraction N1 of about 1.46 and the space below the second surface 735 is air with an index of refraction N2 of 1.00029. In such a case, the critical angle $\Theta critical = \arcsin(1.000293/1.46)$ is about 43 degrees (denoted $A_C$ in FIG. 7). Of course, a similar analysis can be performed on the internal radiation 708 on the first surface 720 of the optical window 705.

As illustrated, a distance (a first distance D1) between the first surface 720 and the second surface 735 at the aft end 730 of the optical window 705 is greater than a distance (a second distance D2) between the first surface 720 and the second surface 735 at the fore end 725 of the optical window 705. In the illustrated embodiment, the optical window 705 is configured as a wedge with a thickness at the aft end 730 of the optical window 705 being greater than a thickness at the aft end 725 of the optical window 705. The exit surface 710 may be formed from a cut in the second surface 735 of the optical window 705. The detection system also includes an optical filter 740 between the exit surface 710 and the detector 715 configured to filter prescribed wavelengths of the emitted radiation 717 at various angles of incidence. A boresight axis of, for instance, a guided munition as described above is designated 745. Additionally, the detection system may include a plurality of optical windows 705 with corresponding detectors 715 and optical filters 740 as described above configured in a selected orientation depending on the application (e.g., a guided munition or vehicle).

Figure 8:
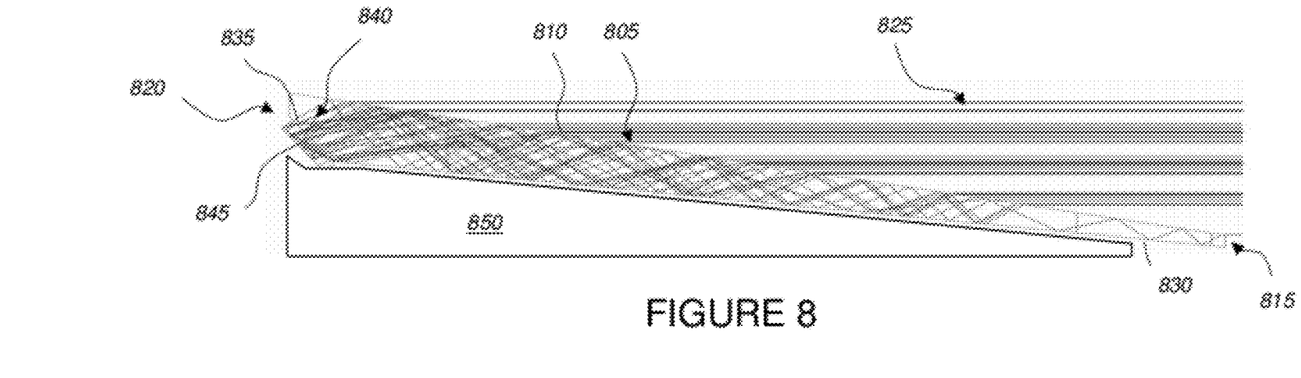

Turning now to FIG. 8, illustrated is a side view of an embodiment of a detection system. An optical window 805 of the detection system includes a first surface 810 extending from a fore end 815 to an aft end 820 of the optical window 805 and configured to receive external incident radiation (illustrated as ray traces and generally designated 825) thereon. The optical window 805 also includes a second surface 830 extending from the fore end 815 to the aft end 820 of the optical window 805 and including an exit surface 835. The first surface 810 and the second surface 830 are oriented to internally reflect a majority portion of the external incident radiation 825 to channel emitted radiation (generally designated 840) through the exit surface 835 to a detector 845. The design of the optical window 805 has an advantage of providing additional packaging space 850 below (or inside) of the second surface 830 within, for instance, the fore end (or nose) of a guided munition or the like.

It should be understood that the principles such as associated with total internal reflection as described above apply to the optical window 805 of FIG. 8. While the external incident radiation (ray traces) 825 is illustrated at zero degrees elevation, it should be understood that the external incident radiation 825 may traverse other angles toward the optical window 805. In an embodiment, the field of view of the detection system is directed to external incident radiation 825 that achieves a total internal reflection path to the detector 845. For instance, external incident radiation 825 with higher angles incident on the first surface 810 may not meet the total internal reflection critical angle with respect to the second surface 830 and exit the optical window 805 before the exit surface 835.

Whereas other designs employ a reflection conduit, waveguide and/or detector below (or inside) of the second (or inner) surface of the optical window (for a guide munition), the present design accommodates the additional packaging space 850 by employing total internal reflection within the optical window 805 and a detector 845 oriented at the exit surface 835 of the optical window 805. Thus, in the environment of the guided munition, other sections of the guidance section or the warhead (or portions thereof) can be located within at least a portion of the fore end (or nose) thereof (see, e.g., FIG. 1). The present design also simplifies the design of the detection system in general for ease of, for instance, manufacturing. For an example of another apparatus for detection radiation, see U.S. Pat. No. 7,511,253 entitled "An Apparatus for Detecting Radiation and Munition Incorporating Same," to Turner, issued Mar. 31, 2009, which is incorporated herein by reference.

Figure 9:
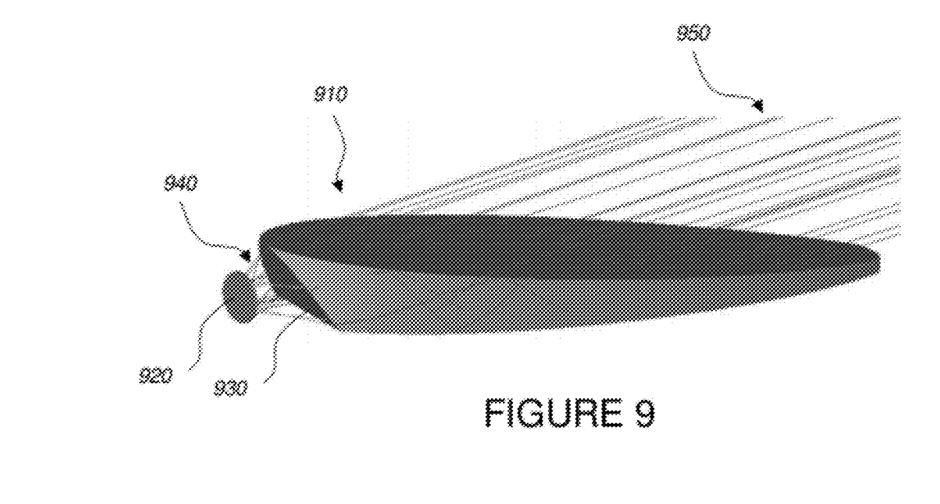
Figure 10:
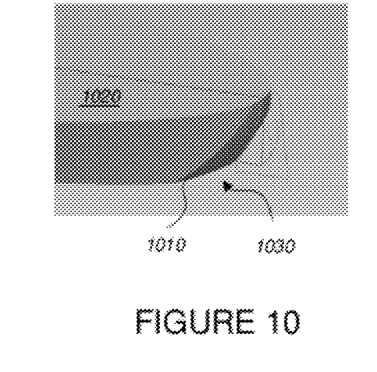
FIGS. 10 to 15 illustrate views of embodiments of an exit surface of an optical window.

Turning now to FIG. 9, illustrated is a side, perspective view of an embodiment of a detection system. The illustrated embodiment demonstrates that a detector 920 is oriented to receive emitted radiation (generally designated 940) from an exit surface 930 of an optical window 910. Again, the optical window 910 is configured to internally channel external incident radiation (illustrated as ray traces and generally designated 950) to the exit surface 930 for emission. The other features of the detection system of FIG. 9 are analogous to the detection systems described above.

Figure 11:
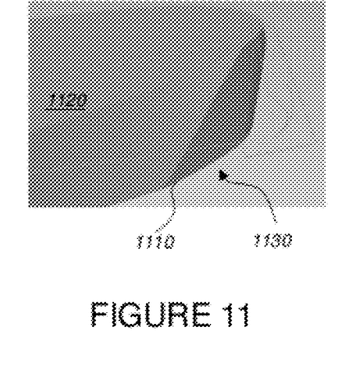
Figure 12:
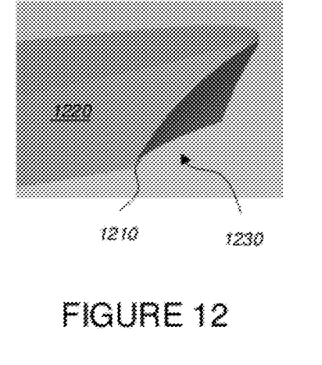
Figure 13:
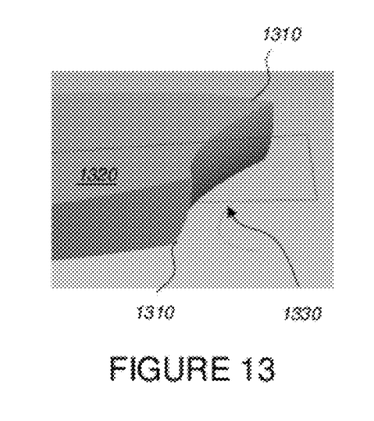
Figure 14:
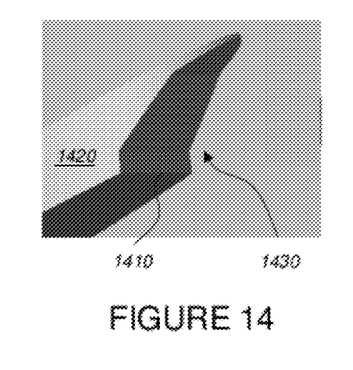
Figure 15:
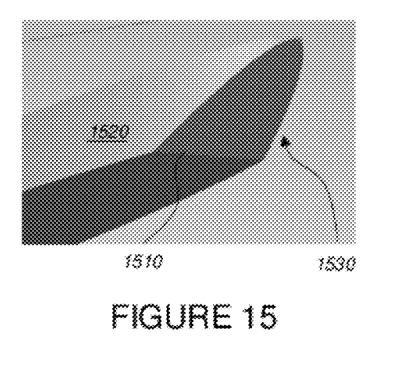

Turning now to FIGS. 10 to 15, illustrated are views of embodiments of an exit surface of an optical window. Beginning with FIG. 10, a convex curve cut is formed in a surface 1010 of an optical window 1020 to create an exit surface 1030. Turning to FIG. 11, a straight curve cut is formed in a surface 1110 of an optical window 1120 to create an exit surface 1130. Turning to FIG. 12, a concave-concave sphere cut is formed in a surface 1210 of an optical window 1220 to create an exit surface 1230. Turning to FIG. 13, a concave curve cut is formed in surfaces 1310 of an optical window 1320 to create an exit surface 1330. Turning to FIG. 14, a three-tiered straight cut is formed in a surface 1410 of an optical window 1420 to create an exit surface 1430. Turning to FIG. 15, a straight cut is formed in a surface 1510 of an optical window 1520 to create an exit surface 1530. Of course, the size and orientation of the exit surfaces may be modified depending on the application and the aforementioned cuts are only examples to form the exit surfaces.

Thus, an optical window employable in a detection system has been introduced herein. The detection system may be employed in a guidance system of a vehicle such as a guided munition. It should be understood that the optical window may be employed in any environment that can take advantage of total internal reflection to channel radiation to an exit surface thereof. In one embodiment, a detection system may include the optical window configured to internally channel (employing total internal reflection) external incident radiation to an exit surface for emission and a detector oriented to receive emitted radiation from the exit surface. The detector as part of a guidance system may assist in targeting the source of the external incident radiation on the optical window. The detection system may also include an optical filter between the exit surface and the detector configured to filter prescribed wavelengths of the emitted radiation at various angles of incidence. The detection system may include detection channels with a plurality of optical windows and corresponding detectors (e.g., at least three) arranged in a regular distributed axial rotational pattern.

The optical window may include a first surface extending from a fore end to an aft end of the optical window and configured to receive the external incident radiation thereon, and a second surface extending from the fore end to the aft end of the optical window and including an exit surface (e.g., formed from a cut). The first surface and the second surface may be oriented to internally reflect a majority portion of the external incident radiation to channel the emitted radiation through the exit surface. A distance between the first surface and the second surface at the aft end may be greater than a distance between the first surface and the second surface at the fore end.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown. It is therefore evident that the particular embodiments disclosed above may be altered or modified and all such variations are considered within the scope and spirit of the invention. It is apparent that an invention with significant advantages has been described and illustrated. Although the present invention is shown in a limited number of forms, it is not limited to just these forms, but is amenable to various changes and modifications without departing from the spirit thereof.

What is claimed is:

1. A system, comprising:
   a nose section of a vehicle comprising a surface configured to have a generally conical shape with at least one opening through at least a part of the surface of the nose section with the shape being elongated between a base and an apex of the nose section;
   at least one optical window, comprising an exit surface, configured to aerodynamically conform to the at least one opening of the nose section, wherein the at least optical window is further configured to channel an incident radiation from outside the nose section to said exit surface through which at least a portion of the incident radiation passes out of the at least one optical window; and
   a detector oriented to receive the incident radiation passed through said exit surface.

2. The system as recited in claim 1 wherein said at least one optical window comprises:
   a first surface exposed through said at least one opening of the nose section to receive said incident radiation thereon; and
   a second surface configured to be within said nose section extending between said base and said apex of said nose section and including said exit surface;
   wherein said first surface and said second surface being oriented to reflect a majority portion of said incident radiation within the at least one optical window to channel said incident radiation through said exit surface to the detector.

3. The system as recited in claim 1 wherein said at least one optical window comprises a first surface and a second surface together forming a wedge shape extending between the base and the apex of the nose section, a distance between said first surface and said second surface at the apex of the nose section being greater than a distance between said first surface and said second surface at said base of the nose section.

4. The system as recited in claim 1 wherein said exit surface of said at least one optical window comprises at least one of a size and orientation responsive to an orientation of said detector.

5. The system as recited in claim 1 further comprising an optical filter between said exit surface and said detector configured to filter prescribed wavelengths of said emitted radiation at various angles of incidence.

6. The system as recited in claim 1 further comprising a plurality of optical windows and a plurality of corresponding detectors.

7. The system as recited in claim 6 wherein said plurality of optical windows and said plurality of corresponding detectors are arranged in a regular distributed axial rotational pattern about the nose section.

8. A method, comprising:
providing a nose section of a vehicle with a surface that is generally conical shape comprising at least one opening through the surface of the nose section and at least one optical window that aerodynamically conforms to said at least one opening, said at least one optical window comprises an exit surface located within the nose section;
channeling incident radiation, through said at least one optical window, to said exit surface of said at least one optical window through which at least a portion of the incident radiation passes out of the at least one optical window at the exit surface; and
orienting a detector to receive said radiation emitted through said exit surface.

9. The method as recited in claim 8, further comprising:
receiving said incident radiation on a first surface, the first surface extending between a base and apex of the nose section;
providing a second surface extending inside of the nose section and between the base and apex of the nose section the second surface further including said exit surface; and
orienting said first surface and said second surface to internally reflect a majority portion of said incident radiation to channel said incident radiation through said exit surface.

10. The method as recited in claim 9 wherein a distance between said first surface and said second surface at an apex of the nose section is greater than a distance between said first surface and said second surface at a base of the nose section.

11. The method as recited in claim 8 wherein said exit surface is formed from removal of a part of a surface of said optical window located within the nose section.

12. The method as recited in claim 8 further comprising filtering prescribed wavelengths of said emitted radiation at various angles of incidence before receiving said radiation at said detector.

13. The method as recited in claim 8, further comprising:
channeling incident radiation within a plurality of optical windows to a respective exit surface of each optical window of said plurality of optical windows; and
orienting each one of a plurality of corresponding detectors to a respective exit surface of a respective optical window of said plurality of optical windows to receive radiation from said respective exit surface.

14. The method as recited in claim 13 wherein said plurality of optical windows and said plurality of corresponding detectors are arranged in a regular distributed axial rotational pattern about the nose section.

15. A guided munition, comprising:
a nose section comprising a surface configured to have a generally conical shape with at least one opening through at least a part of the surface of the nose section with the shape being elongated between a base and an apex of the nose section;
a warhead; and
a guidance system, comprising:
a detection system located within the nose section, comprising:
at least one optical window, comprising a plurality of surfaces with an exit surface located within the nose section, configured to aerodynamically conform to the surface of the nose section to channel incident radiation emitted from a target through the at least one optical window and through said exit surface of the at least one optical window, so that at least a portion of the incident radiation passes out of the at least one optical window at the exit surface; and
a detector oriented to receive emitted radiation emitted through said exit surface of said at least one optical window and convert said emitted radiation to a detection signal; and
a control system configured to generate a control signal to guide said guided munition to said target as a function of said detection signal.

16. The guided munition as recited in claim 15 further comprising control surfaces and an actuator coupled thereto, said control system configured to generate said control signal to control said control surfaces via said actuator to guide said guided munition to said target.

17. The guided munition as recited in claim 15 wherein said at least one optical window, comprises:
a first surface exposed on a surface of the nose section, extending between a base and an apex of the nose section and configured to receive said external incident radiation thereon; and
a second surface located within the nose section, extending between the base and the apex of the nose section and including said exit surface, said first surface and said second surface being oriented to reflect a majority portion of said incident radiation between the first and second surface to channel said radiation to and through said exit surface.

18. The guided munition as recited in claim 15 wherein said at least one optical window comprises a first surface and a second surface extending between a base and an apex of the nose section, a distance between said first surface and said second surface at said base being greater than a distance between said first surface and said second surface at said apex.

19. The guided munition as recited in claim 15 wherein said detection system further comprises an optical filter between said exit surface and said detector configured to filter prescribed wavelengths of said emitted radiation at various angles of incidence.

20. The guided munition as recited in claim 15 wherein said detection system further comprises a plurality of optical windows and a plurality of corresponding detectors.

* * * * *